Aug. 12, 1958  M. T. MOLLER  2,846,976
EGG HOLDER FOR INCUBATOR TRAY
Filed Jan. 31, 1955  2 Sheets-Sheet 1
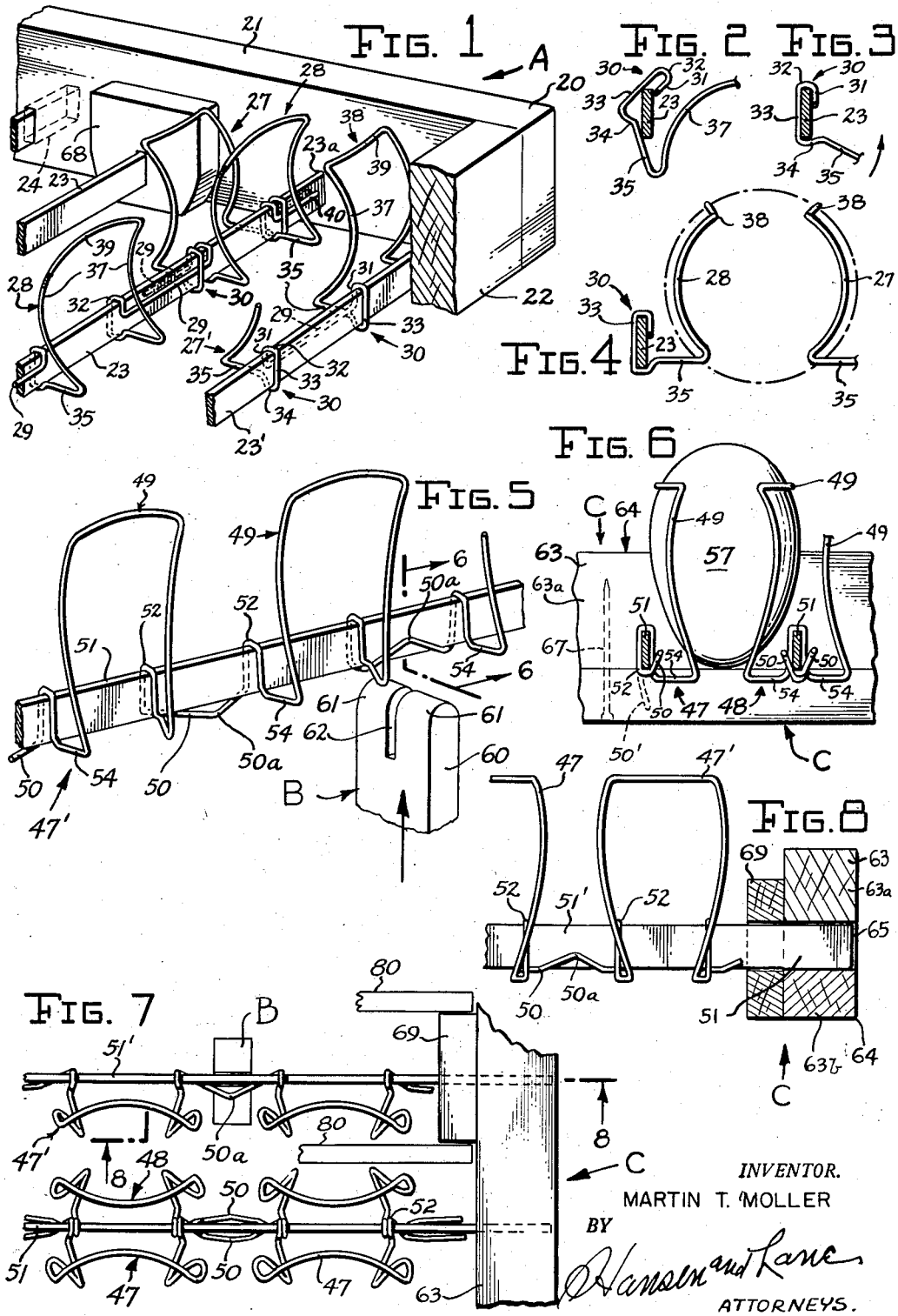
INVENTOR.
MARTIN T. MOLLER
BY
Hansen and Lane
ATTORNEYS.

Aug. 12, 1958 M. T. MOLLER 2,846,976
EGG HOLDER FOR INCUBATOR TRAY
Filed Jan. 31, 1955 2 Sheets-Sheet 2

INVENTOR.
MARTIN T. MOLLER
BY
Hansen and Lane
ATTORNEYS.

United States Patent Office 2,846,976
Patented Aug. 12, 1958

2,846,976

EGG HOLDER FOR INCUBATOR TRAY

Martin T. Moller, Los Altos, Calif.

Application January 31, 1955, Serial No. 484,870

4 Claims. (Cl. 119—43)

This invention relates to egg trays, and pertains more particularly to egg-holding incubator trays for use in rotatively mounted egg-turning racks of artificial incubators.

As is well known in the egg hatching industry, it is desirable to tilt or turn an egg at intervals during its incubation period. It has been found that this can be readily and efficiently accomplished by having eggs in compartmentized trays which are supported in rotatively mounted tray-carrying drums within the confines of an incubator cabinet. Near the end of the incubation period, and before hatching, since the egg-holding trays are not suited to the support of the newly hatched chicks, it is necessary that the eggs be transferred from their compartmentized trays and placed in non-compartmentized and non-tilting hatching trays during the final hours before hatching.

In my improved arrangement, eggs mounted in axially upright position may be turned through an angle twice as great as is now generally practiced without striking against each other or the tray, and when mounted in axially horizontal position may be turned through a complete rotation of 360°.

An object of this invention is to provide a practical way to greatly increase the amount of turning of eggs in incubators so as to improve the hatchability of eggs.

A further object of the present invention is to provide an improved egg holding tray having a plurality of pairs of egg-retaining clips between which individual eggs are nested and held against dislodgement irrespective of the position or angle of tilt assumed by the egg filled tray.

Another object of the invention is to provide a series of egg holding clip members which are almost totally preformed from spring wire, and which may be readily mounted upon spaced supporting bars provided transversely of an egg tray.

A further object is to provide means whereby preformed wire egg holding clip members may be locked into position on support bars in an egg tray by a final forming operation to thereby prevent accidental disengagement of the clips from the bar members upon which they are mounted.

A still further object of the invention is to provide an improved tray structure for cooperation with auxiliary egg stripping means whereby all of the eggs may be stripped simultaneously from a tray for deposit upon a hatching tray.

Still another object of the invention is to provide an improved egg tray including means whereby proper alignment is assured between an auxiliary egg releasing implement and the egg trays.

A further object of the invention is to provide an improved and simplified wire clip structure for supporting eggs in an incubator egg tray.

A further object is to provide an improved egg holding clip with its upper end formed to facilitate the insertion of eggs therein and its bottom portion formed to cushion an egg inserted therein.

These and other objects and advantages of the invention will be apparent from the following description and the accompanying drawings, wherein:

Fig. 1 is a fragmentary perspective view of a corner portion of an egg-holding tray embodying a form of the present invention and showing multiple-loop spring wire clip members mounted on support bars for holding eggs with their major axes horizontal.

Fig. 2 is an enlarged fragmentary sectional view showing the bar-clasping portion of the clip member of Fig. 1 in the act of being mounted upon a support bar.

Fig. 3 is a view similar to Fig. 2 showing the clip member fully engaged with the support bar except for the final lock-forming bending operation indicated by the arrow.

Fig. 4 is a fragmentary sectional view showing the final assembled and locked form of the egg-holding clip member.

Fig. 5 is a fragmentary perspective view of a modified form of clip member as it appears when attached to a support bar and showing how the bar encircling portions are locked onto the support bar by the use of a wire-bending tool shown in phantom lines.

Fig. 6 is a sectional view taken along line 6—6 of Fig. 5 with the addition of adjacent tray frame parts not shown in Fig. 5, an egg being shown supported between a pair of the clip members.

Fig. 7 is a fragmentary top plan view of an egg tray embodying the modified form of clip member shown in Figs. 5 and 6.

Fig. 8 is a sectional view taken along the line 8—8 of Fig. 7.

Figure 9:
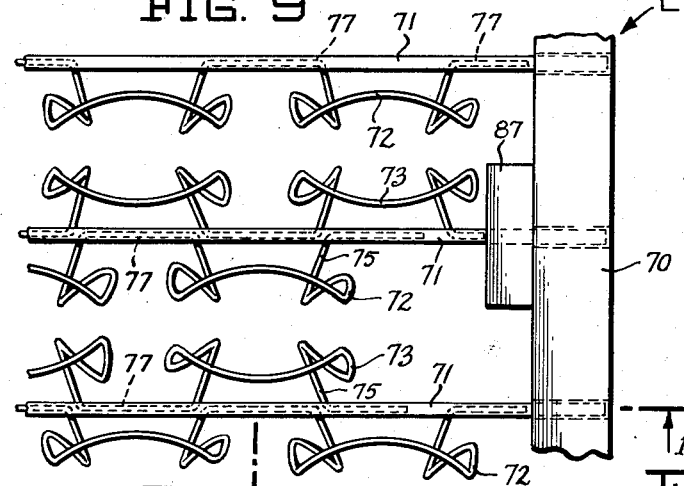
Fig. 9 is a fragmentary top plan view of an egg tray embodying still another modified form of the invention.
Figure 10:
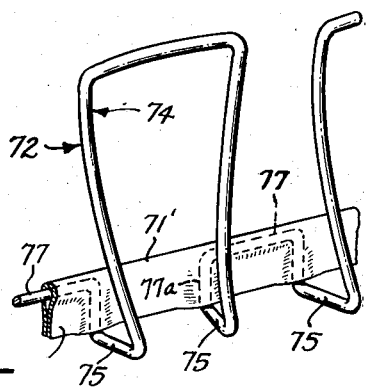
Fig. 10 is an enlarged perspective view of a portion of the structure shown in Fig. 9.
Figure 11:
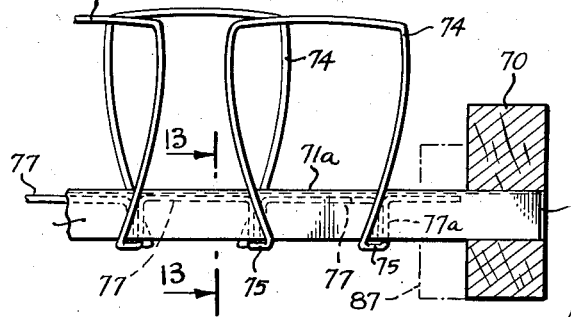
Fig. 11 is a sectional view taken along the line 11—11 of Fig. 9.

A preferred form of the present invention, shown in Figs. 1 to 4 inclusive, is embodied in an incubator egg tray A (Fig. 1). The tray A includes a rectangular frame 20 which may be of any suitable material. In the drawings the frame is of wood, with side members 21 and end members 22 secured rigidly together at all four corners. Within the confines of the frame 20, and extending at right angles between opposite side members 21 thereof, are a plurality of parallel, spaced, transverse, support bars 23, each having its end portions 23a embedded in separate mortises 24 spaced along the length of the frame side members 21.

Mounted in back-to-back relation on the span of each of the transverse bars 23 (except the endmost bar 23', Fig. 1, at each end of the tray) is a pair of generally similar, but oppositely facing, egg holding clip members 27 and 28. Each clip member is made from a continuous length of suitable light gauge spring wire, which should be of a size to engage the eggs with sufficient force to retain them against displacement even when the tray is inverted, but to allow them to be inserted in or removed from the tray without breakage. Each endmost bar 23' has but a single clip member thereon. To facilitate an understanding thereof the single clip member 27' on the end bar 23' will be described first.

This clip member 27' comprises a plurality of straight run intermediate portions 29 which fit closely against the side face of the support bar 23'. From each end of each straight run portion 29, a bar encircling wire portion 30 extends upwardly at 31, is bent at 32 reversely over the upper edge of the bar 23', and thence extends at 33 down the opposite side of the bar from the straight intermediate portion 29.

At the lower end of the portion 33 the wire is bent to extend closely beneath the lower edge of the bar 23', and has a slightly upwardly extending hump or reverse bend 34 formed therein to cam beneath the bar 23' when assembling the clip member on the support bar to retain the clip member thereon. From this reversely bent retaining portion 34 a straight support arm portion 35 (Fig. 4) extends outwardly substantially perpendicularly to the plane of the side face of the bar 23' upon which the clip member is mounted. From the outer or free end of the support arm portion 35 the lower end of one leg 37 of a generally rectangular inverted U-shaped egg engaging loop portion 38 is bent to extend upwardly. The legs 37 and top 39 of each egg engaging loop portion 38 are curved to conform to the curvature of an egg of predetermined size to be held thereby.

The clip member 27' consists of a series of alternate straight run portions 29 with their bar encircling wire portions 30 on each end thereof, and egg embracing loop portions 38 supported in outwardly spaced relation to the bar 23' by the support arms 35.

A short laterally extending end portion 40, like half of a straight run portion 29, is provided at each end of the clip member 27 to hold the outermost loops 38 thereof in properly spaced relation to the side walls 21 of the frame 20.

In fabricating the clip members 27 and 28, and before mounting them on the bars 23 and 23', the reverse bend portions 34 and the support arm portions 35 are not bent upwardly to their full, bar-gripping positions as shown in Fig. 4, but instead are inclined downwardly as shown in Figs. 2 and 3 at an obtuse angle to the upright bar-encircling portion 33.

When thus bent, the humps formed by the reversely bent portions 34 may be cammed inwardly beneath the lower edge of the bar 23, but will engage the bar sufficiently to retain the clip member 27 or 28 thereon.

After being thus assembled on the bars 23 and 23' as shown in Fig. 3, the support arm portions 35 are bent upwardly sufficiently to stand in the position shown in Fig. 4 when released, thereby drawing the bar-encircling wire portions 30 into tightly locked relation with the bars 23 and 23'.

On all of the interior bars 23 of the tray A, two oppositely facing clip members 27 and 28 are mounted in back-to-back relation. These clip members may be similar to each other with the exception that the length of the straight run intermediate portions 29 on one clip member of each pair, for example, the clip member 28 in Fig. 1, is slightly longer than the straight run portions of the other clip member 27 to permit the interposing of the bar encircling portions 30 of one of each pair of clip members within the bar encircling portions 30 of the other clip member.

A modified form of the invention is shown in Figs. 5 to 8 inclusive. In this modified form of the invention a plurality of clip members 47 and 48 are, in general, like the clip members 27 and 28 of the form of the invention shown in Figs. 1 to 4 inclusive.

The modified clip members 47 and 48 are made from single lengths of light spring wire and consist of alternate egg embracing loop portions 49 and intermediate portions 50 mounted on bars 51 which may be similar to the bars 23 of Fig. 1.

The intermediate portions 50 are of broad V shape, and, when initially formed for assembly on the support bar 51, each intermediate portion 50 is bent downwardly and slightly inwardly from the lower ends of a pair of bar encircling portions 52 which are hooked over the upper edge of the support bar 51. This initial inward bend of the intermediate portions 50 is shown by the broken line 50' in Fig. 6, and is such as to permit them to be cammed laterally outwardly by the bar 51 when initially assembling the clip members on the bar, and to retain the clip members thereon when assembled.

From the lower end of each bar encircling portion 52 opposite that connected to the intermediate portion 50, a support arm portion 54 is bent to extend outwardly from a side of the support bar 51. The inverted, U-shaped egg gripping loops 49 are formed to extend upwardly from free ends of each of each adjacent pair of support arms 54.

Each egg engaging loop portion 49 is shaped to conform to an egg 57 (Fig. 6) which it is designed to support. It will be noted that the conformation of the loops 38 of Figs. 1 to 4 inclusive is such as to support the eggs in axially horizontal position, while in the form shown in Figs. 5 to 8 inclusive the loops 49 are shaped to support the eggs in axially upright position. Either form of loop may be provided as desired.

As in the form of the invention shown in Figs. 1 to 4 inclusive, a single clip member 47' is provided on the endmost bar 51' at each end of the tray C, while two clip members 47 and 48 are mounted in back-to-back relation on each of the intermediate bars 51 of the tray. Also, as in the clip members 27 and 28, the intermediate portions 50 of one clip member of each such two clip members, for example the member 47 on each bar, is sufficiently shorter than the intermediate portions 50 of the other clip member 48 thereon to cause the bar encircling portions 52 of the clip member 47 to be interposed within the corresponding portions of the other clip member on the bar.

When thus assembled on the bars 51, the V-shaped intermediate portions 50a of the clip members 47' at each end of the tray will be inclined transversely beneath the support bar 51, while in the other bars 51 the intermediate portions 50 will be similarly inclined and will also be inserted one through the other as shown on the lower bar 51 in Fig. 6 so as to cross each other beneath the support bar.

Thereafter, by any suitable means such as a crimping or bending tool B (Figs. 5 and 7) the V-shaped intermediate portions 50 may be bent upwardly along the same side of the support bar 51 as their support arms 54. This final bending operation draws the bar encircling portions closely around the bar 51 as shown at the right hand portion of Fig. 5 and in solid line in Fig. 6 and locks the clip members firmly onto the bars.

The bending tool B consists of a bar 60 having a rounded nose portion 61 and a slot 62 lengthwise therein of a width to receive a support bar 51 freely therein. By forcing the bar 51 downwardly into this slot with the rounded nose portion 61 of the tool centered in the apex portion 50a of the V-shaped intermediate portions 50 and 50', these intermediate portions 50 and 50' will be bent upwardly alongside the bars 51 upon which they are mounted and as a result thereof will draw the bar encircling portions 52 into tightly wrapped engagement with the bars 51 to lock the clip members onto the bars.

In the tray C (Figs. 6 to 8 inclusive) it will be noted that the sides 63 of the frame 64, instead of being mortised solid members as in the frame sides 20 of Fig. 1, consist of an upper portion 63a with notches 65 in the under sides thereof to receive the end portions of the support bars 51 closely therein, and a lower strip portion 63b which binds the lower edges of the bars 51 tightly in their notches. The lower strip portion 63b is secured in place as by nails 67 (Fig. 6).

Figure 15:
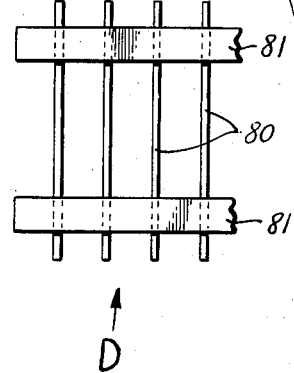
Fig. 15 is a fragmentary top plan view to the same scale as Fig. 14 of an egg stripping device for simultaneously stripping an entire filling of eggs from the trays.

Tapered guide blocks 68 in Fig. 1 and 69 in Figs. 7 and 8 are fixed to the inner sides of the tray side members 20 and 63 respectively for the purpose of guiding an egg stripping device D (Figs. 15 and 16) during an egg stripping operation which will be described later herein.

Figures 12, 13:
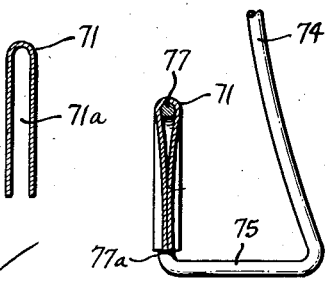
Fig. 12 is an enlarged transverse sectional view of one of the channel bars shown in Figs. 9, 10 and 11 before mounting and locking the clip members therein.
Fig. 13 is an enlarged fragmentary sectional view taken along line 13—13 of Fig. 11 showing the clip member locked in the channel.

A further modified form of the invention is shown embodied in a tray E in Figs. 9 to 16 inclusive. In this arrangement, a tray frame 70 is generally similar to that shown in Fig. 1. The support bars 71, however, are elongated strips of sheet metal folded upon themselves along their longitudinal center lines to define downwardly opening, U-shaped channel sections as best shown in Fig. 12. The egg supporting clip members 72 and 73 are formed with inverted U-shaped egg engaging loop portions 74 generally similar to the loop portions 49 of Figs. 5 to 9 inclusive. These egg engaging loop portions 74 are bent upwardly from the outer ends of support arm portions 75 which, in turn, are bent outwardly from the lower ends of the side leg portions 77a of rectangular, inverted, U-shaped intermediate bar engaging portions 77.

These bar engaging intermediate portions 77 are inserted upwardly into the downwardly open channels 71a of the support bars 71 to seat fully therein as shown in Fig. 13, after which the sides of the channel bar members 71 are deformed inwardly by suitable press means, not shown, to conform to and grip the intermediate portions 77 firmly therein.

Figure 14:
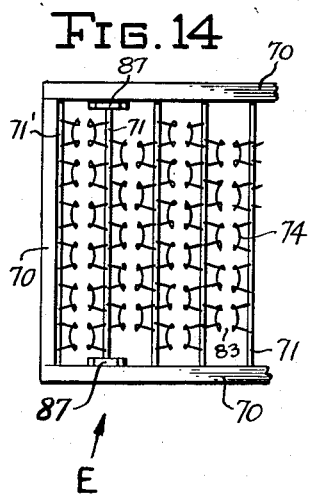
Fig. 14 is a fragmentary bottom view in reduced scale showing one end portion of an egg tray embodying the principles of the invention.

On all of the channel bars 71 except the endmost one 71' at each end of the frame 70, two oppositely facing clip members 72 and 73 are mounted in back-to-back relation. When so mounted, the intermediate portions 77 of one clip member of each two thereof mounted on the same bar preferably are interposed lengthwise between the intermediate portions 77 of the other clip member thereon. This arrangement causes the egg engaging loop portions 74 of the clip member mounted on one side of a channel bar 71 to be interposed or staggered lengthwise between the loop portions 74 of the other clip member thereon. When mounting the channel bars in the frame it obviously will be necessary to position them with their loops 74 facing each other in egg-engaging, opposed pairs as shown in Fig. 14.

For stripping an entire filling of eggs from any of the trays A, B or E described herein and illustrated in the accompanying drawings, the stripping device D (Figs. 15 and 16) may be employed.

This stripping device comprises a plurality of similar, thin, rigid, transverse strips 80 of a thickness to fit freely between opposed rows of egg gripping loops 74, one of said strips preferably being provided for each row of eggs 84 in the tray to be emptied. The strips 80 may be of any suitable material, such as wood, and are supported in parallel, spaced relation upon a pair of longitudinally extending tie bars 81. The strips 80 are of length slightly less than the internal width of the tray E (Figs. 14 and 16) from which they are intended to strip a filling of eggs, and are separated so as to fit into the spaces 83 occupied by the rows of eggs 84 between each opposed pair of egg-engaging clip members 72 and 73 in the tray. The tapered guide blocks 87 secured to the sides of the tray C, similar to the blocks 68 and 69 mentioned previously herein, guide the strips 80 into centered position in these spaces 83 and into engagement with the rows of eggs 84 therein.

Figure 16:
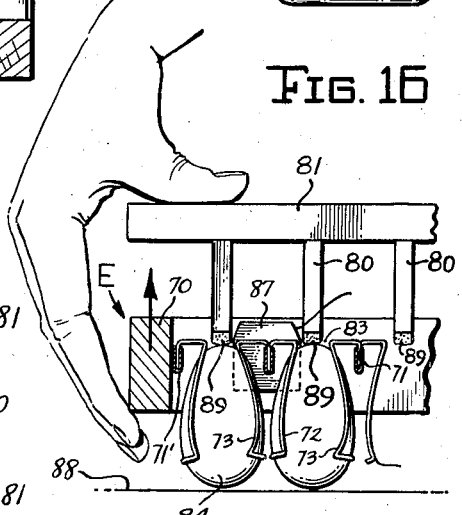
Fig. 16 is an enlarged fragmentary sectional view of the egg tray of Fig. 14 and the stripper of Fig. 15, showing the stripper being used to strip the eggs from between pairs of egg engaging loops of the tray.

The strips 80 are of sufficient width so that when the stripping device D is pressed fully home by holding it lightly on top of the eggs in the inverted tray as shown in solid lines in Fig. 16 while raising the tray E as indicated by the arrow in Fig. 16, the eggs will remain on the supporting surface 88 and will be freed from engagement with the clip members 72 and 73. In order to minimize the possibility of damaging the eggs during this stripping operation, soft cushioning strips 89, which may be of foam rubber or other suitable material, may be provided along the lower edges of the strips 80.

While I have illustrated and described a preferred embodiment of my invention, as well as some modifications thereof, it will be understood however that other changes and modifications may be made in the details thereof without departing from the scope of the invention as set forth in the appended claims.

Having thus described the invention, what I claim as new and desire to protect by Letters Patent is defined in the following claims.

I claim:

1. In an incubator tray having an open rectangular frame, a plurality of strong, thin channel support bars of inverted U-sectional shape extending transversely of the tray in parallel, spaced relation, a pair of co-operating clip members mounted on adjacent support bars, each clip member comprising a continuous length of light, spring wire comprising alternately disposed egg-engaging loops and intermediate portions, the loops of one clip member extending toward those of the other clip member in opposed, egg engaging pairs, each intermediate portion extending lengthwise of the support bar in fully inserted condition in the channel thereof, a portion of each clip member at each end of the intermediate portion extending transversely within the channel of a support bar upon which the clip member is mounted, the side walls of each support bar extending inwardly toward each other into closely gripping relation with the portions of the clip member inserted therebetween.

2. An incubator tray comprising an open rectangular frame, a plurality of strong, thin channel support bars mounted in parallel, spaced relation transversely of the frame, a pair of cooperating egg supporting members mounted on adjacent support bars and extending toward each other, each egg supporting member comprising a length of light, spring wire comprising alternately disposed upright egg-engaging loops and intermediate portions, each loop of one egg supporting member being opposite a loop of the other egg supporting member in egg engaging pairs, each intermediate portion comprising a pair of laterally extending support arms integral with the lower portion of each loop, and a portion inserted between the walls of the support bar toward which its support arms extend, the walls of each support bar extending inwardly toward each other into closely gripping relation with said portions inserted therebetween.

3. An egg incubator tray having an open, normally horizontal, rectangular frame, a plurality of strong, thin, channel support bars mounted in parallel, spaced relation to each other transversely of the frame, the separation between adjacent bars being greater than the length of the minor axis of an egg to be held in said tray, a plurality of pairs of egg engaging members of light spring wire mounted in opposed, spaced relation on each adjacent pair of support bars and extending toward each other, an upwardly bowed egg engaging loop portion in each egg engaging member, a pair of transversely extending support arms integral with the lower ends of the sides of each loop portion and extending laterally therefrom to the support bar next adjacent thereto, and a support bar engaging portion on the outer end of each support arm and inserted in tightly gripped relation within the channel of its support bar, thereby securing each support arm to its support bar, whereby each pair of opposed loops is wholly supported on adjacent bars, each opposed pairs of loops on adjacent bars being spaced apart to receive an egg in wholly supported condition between each opposed pair of said loops.

4. An arrangement according to claim 3 wherein the opposed egg engaging members on each pair of adjacent bars are aligned to receive an elongated egg stripping bar therebetween.

References Cited in the file of this patent

UNITED STATES PATENTS

| | | |
|---|---|---|
| 369,753 | Tellefson et al. | Sept. 13, 1887 |
| 557,622 | Spurr | Apr. 7, 1896 |
| 2,216,876 | Crum | Oct. 8, 1940 |
| 2,527,713 | Dunn | Oct. 31, 1950 |